Oct. 1, 1929.   T. A. CREIGHTON   1,729,989
REMOVABLE PISTON GUIDE
Filed Dec. 24, 1927

INVENTOR.
THOMAS R. CREIGHTON.
BY
ATTORNEY.

Patented Oct. 1, 1929

1,729,989

UNITED STATES PATENT OFFICE

THOMAS A. CREIGHTON, OF VENTURA, CALIFORNIA.

REMOVABLE PISTON GUIDE

Application filed December 24, 1927. Serial No. 242,380.

The piston of mud pumps and the like, after they have been run for a considerable length of time become badly worn and the present practice is to discard the old piston, re-bore the cylinder, and insert a new piston.

An object of my invention is to provide a guide for a piston which is placed thereon, after the piston has become worn.

Another object is to provide a guide of the character stated which can be quickly fit in position on the piston, and can be readily replaced when worn.

Still another object is to provide a guide which is simple in construction, inexpensive to manufacture, and effective in operation.

Other objects, advantages and features of invention may appear in the accompanying drawings, the subjoined detailed descriptions, and the appended claims.

In the drawing—

Figure 1:
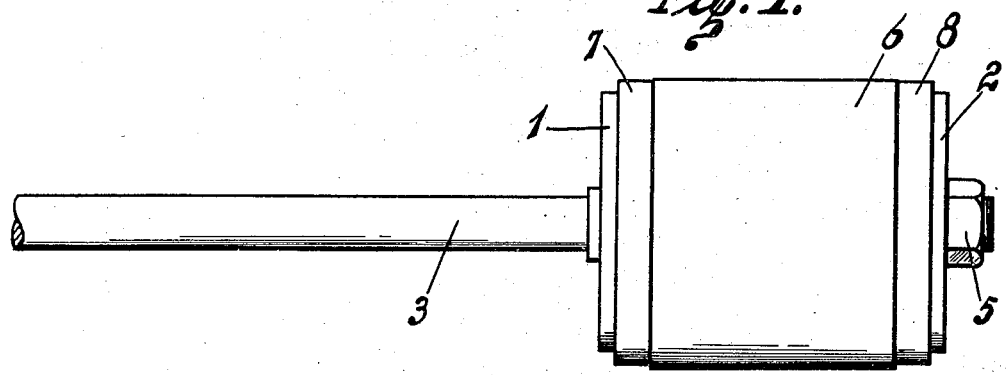
Fig. 1, is a side elevation of a piston with the guide in position thereon.
Figure 2:
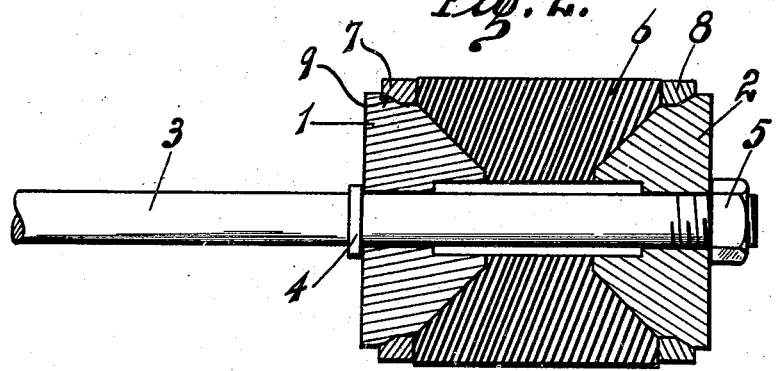
Fig. 2, is a longitudinal sectional view of the piston.
Figure 3:
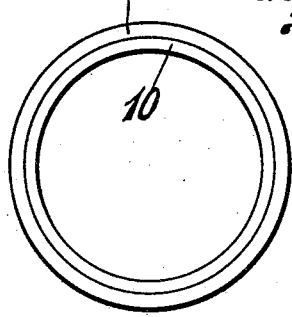
Fig. 3, is an end view of one of the guides.

Referring more particularly to the drawing, pistons of the type used in mud pumps and the like, usually comprise a pair of frustro conical end blocks 1, 2, which are mounted on the pitman 3, the blocks 1, preferably resting against a shoulder 4, on the pitman, the block 2, resting against a nut 5, which is screwed onto the end of the pitman. A rubber packing member 6, is positioned between the conical blocks 1, 2, and is adapted to expand against the wall of the cylinder to prevent leakage. When the piston is new, the blocks 1, 2, are substantially the same diameter as the cylinder, but when wear occurs, it is necessary to reduce these block in diameter. When this reduction occurs, I insert a pair of guide rings 7, 8, one ring being placed upon each of the blocks 1, 2; the blocks are each provided with an upwardly tapering seat 9, the rings 7, 8, each being provided with a tapering surface 10, which rests upon the seat 9. The rubber packing member 6, bears against the inner surfaces of both rings 7, 8, holding them outwardly into position on the seats, and thus acting as a guide for the piston.

The rings 7, 8, are not split but are solid rings, and do not expand outwardly into place against the walls of the cylinder to prevent leakage as is the case with the usual piston ring. My rings merely act as guides to hold the piston centrally in the cylinder.

It will readily be seen that by unscrewing the nut 5, the block 2 can be slipped off of the piston, after which the ring 8, packing 6, and ring 7, can be removed and replaced as necessary.

It will, of course, be understood that in certain types of pistons the blocks 1, 2, are not frustro conical but are substantially rectangular in shape and also if it is desired the seat 9, may be square instead of tapered and the rings 7, 8, can rest against a square surface.

Having described my invention, I claim:

1. In a piston comprising a pair of end blocks, adapted to be positioned in spacing relation on a piston rod, a packing member between said blocks, a tapered seat on the blocks, and a guide ring fitted against the tapered seat, and resting against the packing member.

2. In combination with a piston comprising a pair of frustro conical end blocks adapted to be mounted in spaced relation on a piston rod, a packing member between said blocks, and a guide ring fitted against the end blocks and bearing against the packing member.

3. In combination with a piston comprising a pair of frustro conical end blocks adapted to be mounted in spaced relation on a piston rod, a packing member between said blocks, an upwardly tapering seat on each of the blocks, a solid ring, a tapered bearing surface on the ring, adapted to rest on the seat of said packing member, bearing against the ring to hold the same in position on the seat.

In testimony whereof, I affix my signature.

THOMAS A. CREIGHTON.